Sept. 9, 1952  C. B. WATTS, JR  2,610,321
GLIDE PATH ANTENNA

Filed Feb. 28, 1948  3 Sheets-Sheet 1

INVENTOR.
CHESTER B. WATTS, Jr.

BY

*R P Morris*
ATTORNEY

Sept. 9, 1952     C. B. WATTS, JR     2,610,321
GLIDE PATH ANTENNA

Filed Feb. 28, 1948     3 Sheets-Sheet 2

INVENTOR.
CHESTER B. WATTS, Jr.
BY
R P Morris
ATTORNEY

Patented Sept. 9, 1952

2,610,321

UNITED STATES PATENT OFFICE 2,610,321

GLIDE PATH ANTENNA

Chester B. Watts, Jr., Indianapolis, Ind., assignor to International Standard Electric Corporation, New York, N. Y., a corporation of Delaware Application February 28, 1948, Serial No. 12,001

15 Claims. (Cl. 343—108)

This invention relates to navigation systems and more particularly to an arrangement for the guidance of a craft along a glide path zone or line.

Previous instrument landing systems have utilized the equisignal method or direct amplitude comparison method for providing either a straight line glide path obtained from a transmitter installed at the far end of the runway or a glide path or zone having a hyperbolic characteristic from a transmitter displaced to one side of the runway.

For the present condition of aviation long runways are needed and the latter type of glide path beacon is favored as it does not present an obstruction to landing. However, because of the displacement the glide path does not reach down to the ground at the region of touchdown unless special shaping of the patterns is provided. Heretofore, this has been accomplished by altering the radiation patterns of the principal glide path radiators. This requires trial and error methods of adjustment, since the principal radiation patterns are quite powerful and local conditions may strongly affect the pattern in the vicinity of the runway.

It is therefore an object of this invention to provide an improved arrangement for producing and modifying predetermined radiation patterns for the guidance of a craft along a prescribed course from units spaced laterally from the runway.

In accordance with an embodiment of my invention, a glide path arrangement, provided as a single unit, is installed on one side of the runway in the vicinity of the point of contact of aircraft upon landing for transmitting radiant energy defining the normal glide path course having a hyperbolic characteristic. In the vicinity of the point of contact the hyperbolic characteristic is modified to provide the more desirable straight line path by a radiant energy transmission from a modifier unit in the glide path arrangement.

The above mentioned and other features and objects of this invention will become more apparent and the invention itself, though not necessarily defined by the said features and objects, will be best understood by reference to the following description of an embodiment of the invention taken in connection with the accompanying drawings wherein.

Figure 1:
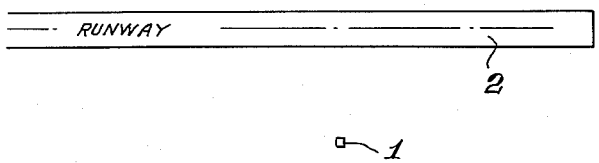
Fig. 1 illustrates in schematic form a glide path arrangement in accordance with the present invention.

According to Fig. 1 the glide path antenna system comprises a single unit 1 preferably horizontally polarized and located on one side of the runway 2 near the point or region of contact of an aircraft upon landing. Preferably the antennas may be operated over a high frequency range for example between 600 and 1000 megacycles per second. The use of smaller and lighter radiating systems in this high frequency range, results in markedly reducing the obstacles to aircraft. The arrays used have so little mass that it may be possible to strike them with the landing edges of an aircraft in flight without resulting in more than minor damage to the aircraft.

Tests also indicate that at these frequencies increased performance can be expected with regard to the freedom from precipitation effects such as rain or snow, as well as the contour of the ground. The design of the antenna system of the present invention places the lower antenna at half the height of the upper antenna. In this arrangement, the effective height of the upper antenna above ground determines the path angle rather than a combination of the effective heights of the upper and lower antennas. A very appreciable snow fall will, therefore, not seriously interfere with the operation of this equipment unless the effective height of the lower antenna is reduced to a fraction of its normal height above ground.

The principles incorporated in this glide path arrangement makes it possible to calculate the array design in order to produce a straight line or any other desired path to the point of contact. In former systems a straight line path had to be obtained entirely by trial and error methods. A further advantage of this system, since the array to produce the straight line path is calculable, is that the equipment can be placed considerably further from the center line of the runway and still obtain the same desirable path characteristics over the complete path length. The design of the antenna system is such that considerable latitude is permitted in the selection of sites on either side of the point of contact.

Figure 2:
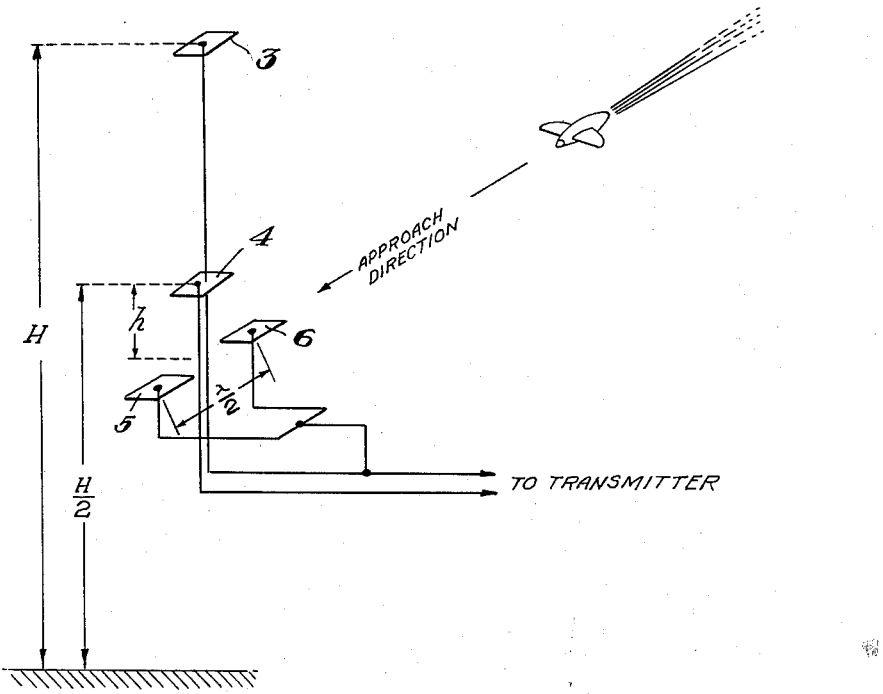
Fig. 2 shows in schematic form the antenna system providing the required radiation pattern for producing the glide path course indication.
Figure 3:
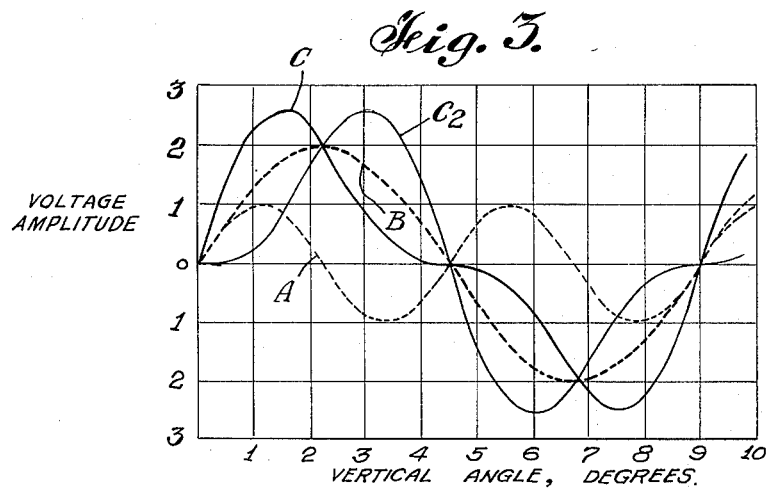
Fig. 3 shows a series of waveforms used in explaining the functioning of the antenna system of Fig. 2.

The antenna system of the present invention differs considerably from that of previous systems. The antennas inherently produce a straight line path and use the null and reference pattern method in forming the path, rather than direct amplitude comparison. As shown in Fig. 2 the glide path antenna system comprises an upper array 3, preferably horizontally polarized, located at a height of a plurality of wavelengths at the carrier frequency above ground. In a preferred model the height selected was 12 feet for a 2¼ degree path in a glide path system operating substantially at 1000 megacycles per second. In this case the vertical radiation pattern in the antenna array 3 which will be produced by ground reflection is shown as curve A of Fig. 3. It should be noted that this pattern has a null at the path angle of 2¼ degrees. The antenna system of Fig. 2 further comprises a lower antenna array 4 which is located directly below 3 at substantially half its height. The vertical pattern of array 4 produced by ground reflection is approximately shown as curve B in Fig. 3. It should be noted that this pattern has a maximum at the path angle. The addition and subtraction of the energy of arrays 3 with the energy of array 4 produces the total radiation patterns C1 and C2 shown in Fig. 3. The intersection of C1 and C2 is the glide path. Fig. 3 illustrates the situation only in the approach direction with only an upper and lower array as described and results in a hyperbolic glide path characteristic.

Figure 4:
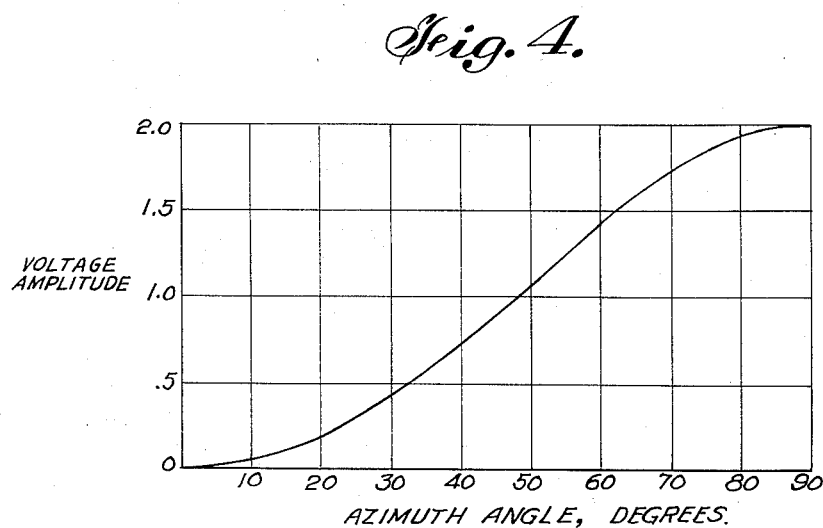
Fig. 4 illustrates a waveform explaining the operation of the modifier arrangement of the antenna system of Fig. 2.

In order to modify the hyperbolic characteristic in the vicinity of the point of contact and provide the more desirable straight line path in this region, a modifier antenna array is provided. This modifier antenna array also serves the purpose of modifying the vertical radiant energy pattern in the azimuth direction in order to provide the glide path to ground since the glide path antenna system is located to one side of the course. Referring to Fig. 2, reference numerals 5 and 6 represent the modifier array, preferably comprising horizontally polarized units spaced ½ wavelength from each other at the carrier frequency and so mounted as to have their effective center of radiation directly under array 3 at a small distance $h$ below the lower array 4. The separation $h$ is just sufficient to avoid interference between the modifier antenna array and the lower array. The line joining the centers of the two arrays 5 and 6 lies parallel to the runway and the direction of approach. Since these arrays 5 and 6 are fed in phase the resulting pattern neglecting the coefficient of the array, will be a figure of eight with the null in the approach direction. This results in modifying the azimuthal distribution of the vertical sideband pattern except parallel to the runway. The result of the modification causes the height of the path to decrease as the function $\cos \theta$, $\theta$ being the azimuth angle from a line parallel to the runway. This is the required condition for a straight line path. Fig. 4 shows the pattern of the modifier plotted in rectangular coordinates.

It may be noted in Fig. 3 that a false path of reverse sensing exists at about 6¾ degrees or three times the true path angle. Down signals predominate between this false path and the true path angle at 2¼ degrees, except at 4½ degrees, where there is an absence of all signals. If this condition proves objectionable, a swamping or auxiliary antenna may be added to the glide path antenna system. Methods for modifying a pattern to eliminate false courses are described in the Patent 2,379,442 to A. G. Kandoian, entitled "Instrument Landing Guide System." The swamping antenna may be provided as part of the single unit of the glide path antenna array to radiate additional high angle signals carrying downward modulation, which fill in the null at 4½ degrees and extend the region of non-ambiguity up to or beyond 6¾ degrees. It has been found by experience that glide paths steeper than 5 degrees are very difficult to follow, and are not likely to be confused with the true path. In addition, the reverse sensing of the first false path at 6¾ degrees will result in both human and automatic pilot flying away from the false path.

Figure 5:
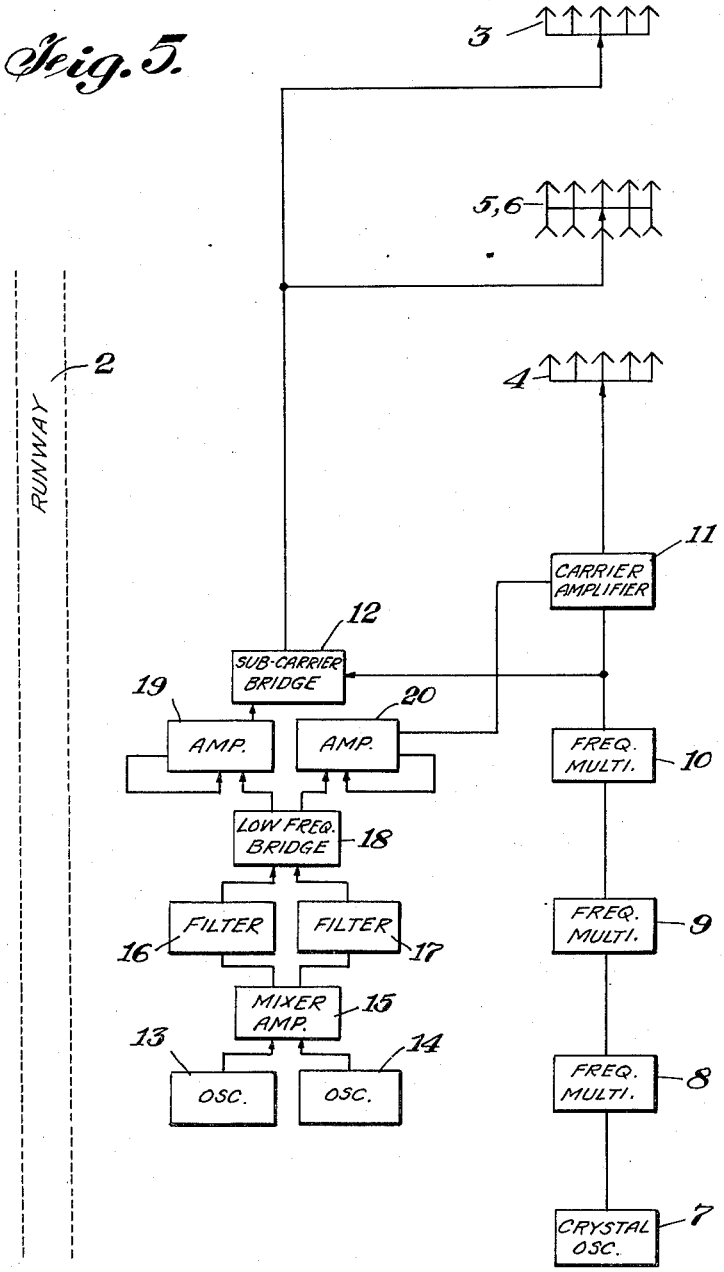
Fig. 5 shows in block diagram form a circuit arrangement for producing radiant energy patterns in accordance with the invention.

Referring to Figure 5, the components of a transmitter energizing the antenna system of Fig. 2 comprise a crystal oscillator 7 which is used to insure the frequency stability of the final carrier frequency energy. A chain of harmonic multipliers 8, 9 and 10 controlled by the crystal oscillator 7 are used to feed the carrier amplifier 11 and sub carrier bridge or carrier sideband generator 12. In order to identify the components of the glide path pattern, separate modulation frequencies such as $f1$ and $f2$ are provided. The relative values of $f1$ and $f2$ should be maintained constant. This may be achieved by providing for example two RC oscillators 13 and 14 so chosen that their difference in frequency is equal to $f1$ and their sum to $f2$. The RC oscillator outputs are mixed in the mixer circuit 15 and amplified. The mixing action produces components of $f1$ and $f2$ which are separated in filter circuit 16 and 17 and adjusted to be equal by suitable means such as a loss network in one filter. If the level of either RC oscillator changes, it will produce equal variations in the magnitude of $f1$ and $f2$ with no resultant course shift.

The modulating frequency outputs $f1$ and $f2$ are fed into opposite terminals of a low frequency bridge 18. This bridge may consist of a hybrid coil or its electrical equivalent. Amplifiers 19 and 20 are connected to the output terminals of the low frequency bridge to amplify the combined modulating frequencies. Amplifier 20 receives equal magnitudes of $f1$ and $f2$ both in their original phase. These waves then modulate the carrier amplifier 11. Amplifier modulator 19 on the other hand receives equal magnitudes of $f1$ and $f2$, with $f2$ reversed from its original phase, which are then used to modulate the carrier sideband generator 12. Both the carrier amplifier and the sideband generator are excited by the common crystal controlled source 7. The function of the sideband generator is to receive some signals from the frequency multiplier 10 and finally to produce only sidebands of the carrier frequency modulated with $f1$ and $f2$. This sideband energy from the sideband generator 12 is delivered to the upper antenna 3 and the modifier antennas 5, 6 of the glide path arrangement. The output of the carrier amplifier 11 provides both carrier and sidebands thereof modulated with $f1$ and $f2$, the latter modulating frequency being phase shifted 180° from its original phase. The output of the carrier amplifier 11 is applied to the lower antenna 4. The sideband energy is delivered to the upper antenna and the modifier antenna is properly phased with respect to the carrier and sideband energy of the lower antenna to produce maximum path sharpness. A slight shift in phase between the sideband generator 12 and the carrier amplifier 11 results only in a slight decrease of sharpness without changing the path angle.

The energization of the antenna arrangement as described produces equal amounts of modulation frequency sideband energy in all of the antenna arrays while in addition providing carrier frequency energy for the lower array. However, the amount of energy fed to the modifier array relative to the other arrays may be varied in order to provide the desirable path characteristic in the vicinity of touchdown. Upon subsequent reception in a mobile craft, the modulation components may be recovered in a receiver and used to operate a course indicator.

While I have described above the principles of my invention in connection with specific apparatus, and particular modifications thereof, it is to be clearly understood that this description is made only by way of example and not as a limitation on the scope of my invention.

I claim:

1. An equisignal glide path beacon for guiding a craft vertically to a point on a landing runway comprising upper and lower radiator means spaced to one side of the runway to produce intersecting radiation patterns of distinctive signal characteristics along a course over said runway, an auxiliary directive radiator means mounted adjacent the lower said first radiator means and directive toward said runway to modify the effective distribution of said patterns, and means for modulating energy radiated from said auxiliary radiator with said distinctive signals.

2. An arrangement as set forth in claim 1, wherein said auxiliary radiator means produces a figure of eight radiation pattern with its null oriented in the direction of a line parallel to said course and passing through said modifier radiator.

3. A radio beacon for providing a glide path over a given course for guiding aircraft for a landing comprising an antenna system mounted on one side of said course, said antenna system comprising an upper radiator and a lower radiator, a source of energy, means for applying energy to each of said radiators to provide a radiant energy guiding pattern over said course having a curvilinear characteristic, means for modifying said pattern to provide a straight line characteristic in the vicinity of said antenna system over said course comprising a modifier radiator mounted adjacent said lower array and having a directive radiation pattern directive towards said runway, and means for energizing said modifier array.

4. An arrangement as set forth in claim 3, wherein said modifier radiator comprises two horizontally polarized arrays spaced one half wavelength apart at the frequency of said energy, and so mounted as to have their effective center of radiation directly under said upper radiator.

5. A radio beacon for guiding a craft along a given course comprising an antenna system mounted on one side of said course, said antenna system comprising an upper radiator means and a lower radiator means, a source of carrier frequency energy, a source of modulation frequency energy, means for modulating said carrier energy with said modulation frequency energy, means for applying modulated carrier energy of given phase to each of said radiators, means for modifying the radiation pattern of said upper and lower radiators comprising a directive modifier radiator means mounted adjacent said lower radiator, and means for energizing said modifier radiator with said modulated carrier frequency energy whereby there is produced a radiant energy pattern effectively defining said course.

6. An arrangement as set forth in claim 5, wherein said modifier radiator means comprise two horizontally polarized radiators spaced one half wave-length apart at said carrier frequency, and so mounted as to have their effective center of radiation directly under said upper radiator.

7. An arrangement as set forth in claim 6, wherein said upper and lower radiator means are spaced apart a plurality of wavelengths at said carrier frequency.

8. An arrangement as set forth in claim 7, wherein said lower radiator means is mounted at substantially half the height of said upper radiator above a radiant energy reflecting plane.

9. An arrangement as set forth in claim 8, wherein said source of modulation energy comprises two separate modulation waves, said carrier frequency energy source comprising separate outputs for said upper and modifier radiator means and for said lower radiator means and means for modulating separate ones of said carrier frequency outputs with said modulating waves of given phase.

10. An arrangement as set forth in claim 9, wherein said means for modulating said carrier frequency output comprises means for modulating one of said carrier frequency outputs with both of said modulation waves of a given phase, and means for modulating the other carrier frequency output with one of said modulation waves and with the other modulation wave reversed from its given phase.

11. An arrangement as set forth in claim 10, wherein one of said carrier frequency outputs comprises a carrier sideband generator.

12. An arrangement as set forth in claim 11, comprising means for applying said other carrier frequency output to said lower antenna array and means for applying said sideband generator output to said upper array and to said modifier array.

13. An arrangement as set forth in claim 12, further comprises means for providing a phase displacement between said other carrier frequency output and said sideband generator output before application to said lower and upper antennas respectively.

14. An arrangement as set forth in claim 5, wherein each of said radiator means comprises horizontally polarized elements.

15. An arrangement as set forth in claim 14, wherein said given phase comprises a 90° phase displacement.

CHESTER B. WATTS, Jr.

REFERENCES CITED

The following references are of record in the file of this patent:

UNITED STATES PATENTS

| Number | Name | Date |
|---|---|---|
| 2,294,882 | Alford | Sept. 8, 1942 |
| 2,373,090 | Alford | Apr. 10, 1945 |
| 2,379,442 | Kandoian | July 3, 1945 |
| 2,397,531 | Busignies et al. | Apr. 2, 1946 |
| 2,400,736 | Brown | May 21, 1946 |
| 2,406,734 | Alford | Sept. 3, 1946 |
| 2,406,876 | Watts | Sept. 3, 1946 |
| 2,416,342 | Newhouse | Feb. 25, 1947 |
| 2,419,551 | Himmel | Apr. 29, 1947 |
| 2,433,351 | Earp | Dec. 30, 1947 |
| 2,449,999 | Armstrong | Sept. 28, 1948 |